United States Patent [19]

Shanoski

[11] 4,245,006
[45] Jan. 13, 1981

[54] LOW-PRESSURE LOW-TEMPERATURE IN-MOLD COATING METHOD

[75] Inventor: Henry Shanoski, Akron, Ohio

[73] Assignee: The General Tire & Rubber Company, Akron, Ohio

[21] Appl. No.: 40,255

[22] Filed: May 18, 1979

[51] Int. Cl.³ .............................................. B32B 27/40
[52] U.S. Cl. .................. 428/423.7; 264/134; 264/255; 264/296; 427/370; 427/393.5; 428/482
[58] Field of Search ............ 427/385 B, 133, 370; 264/134, 255, 338, 296; 260/998.18, 860; 428/63, 425, 482

[56] References Cited

U.S. PATENT DOCUMENTS

| | | | |
|---|---|---|---|
| 3,903,343 | 9/1975 | Pfaff | 264/255 X |
| 3,949,125 | 4/1976 | Roberts | 264/255 X |
| 4,081,578 | 3/1978 | Van Essen et al. | 427/385 B X |
| 4,144,305 | 3/1979 | Cottrell, Jr. et al. | 264/255 X |

Primary Examiner—Ronald H. Smith
Assistant Examiner—Thurman K. Page

[57] ABSTRACT

A method comprises in-mold coating on a molded thermoset polyester glass fiber substrate an in-mold coating composition at a pressure of from about 25 to 50 p.s.i. and at a temperature not in excess of about 150° F. for from about 2 to 12 minutes, said in-mold coating composition comprising the reaction product of an unsaturated aliphatic fumarate polyester diol, a saturated polyester diol flexibilizer, a cross-linking aliphatic polyol having from 3 to 6 OH groups, a diisocyanate in an amount by weight sufficient to provide from about 50 to 120%, preferably from about 80 to 103%, of the stoichiometric amount of —NCO groups required to react with all of the active hydrogen atoms in the coating composition and an ethylenically unsaturated monomer sufficient to polymerize with and crosslink the unsaturated polyester in admixture with a free radical peroxide initiator, an accelerator for said peroxide initiator and a polyurethane tin catalyst.

14 Claims, No Drawings

LOW-PRESSURE LOW-TEMPERATURE IN-MOLD COATING METHOD

This invention relates to a method or process for in-mold coating a thermoset glass fiber reinforced polyester resin part (FRP) with a coating composition at low pressures and low temperatures.

BACKGROUND

SMC (sheet molding compound) used to make FRP parts usually contains about 30% by weight of glass fibers, a large amount of filler(s) and a low shrink additive(s). HMC (high strength molding compound) used to make FRP parts (which have an Izod impact resistance about twice that of FRP parts made from SMC) usually contains about 55 to 60% by weight of glass fibers but does not contain any, or any appreciable amount of, fillers and low shrink additives. Because of the high glass content and lack of fillers and low shrink additives, the HMC part in the mold during curing (at about 300° F. or 149° C. and 600 p.s.i.) is under considerable stress, as compared to the SMC part (molded and cured under the same conditions), due to polymerization shrinkage and the usual inhomogeneous distribution of glass fibers throughout the polyester resin composition. Moreover, on removal from the mold the cured HMC part thermally shrinks more than the cured SMC part at room temperature (about 25° C.), and is more distorted and has a poorer surface smoothness than the cured SMC part. For example, the molded and cured SMC part will generally exhibit a profilometer reading (surface roughness—distance between peaks and valleys) of about an average of 100 microinches while the molded and cured HMC part will exhibit a profilometer reading of an average of about 750+ microinches.

Thus, when in-mold coating a HMC molded and cured part according to the high temperature and high pressure in-mold coating process of U.S. Pat. No. 4,081,578, even through the coating may conform perfectly to the cavity of the mold during molding, the HMC part and its in-mold coating will buckle and deform after the mold is opened and the part cooled.

It, therefore, is an object of the present invention to attempt to overcome the difficulties alluded to hereinabove and to provide a method for in-mold coating a thermoset glass fiber reinforced polyester resin part (FRP) such as a HMC part which exhibits an improved surface.

These and other objects and advantages of the present invention will become more apparent to those skilled in the art from the following detailed description and working example.

SUMMARY OF THE INVENTION

According to the present invention it has been found that an in-mold coating composition comprising a polyisocyanate, preferably a polyisocyanate prepolymer containing excess polyisocyanate, additional polyols, an unsaturated polyester, a crosslinking unsaturated monomer, a tin catalyst for the urethane forming reaction, a relatively large amount of a peroxide initiator and an accelerator for the peroxide initiator will enable molding and curing of the in-mold coating at pressures of from about 25 to 50 p.s.i. and at temperatures of not above about 150° F. (65.6° C.). Depending on the amount of catalyst and accelerator used, the curing time may vary from about 2 to 12 minutes, and the pot life of the in-mold coating composition (mixture of two components) may vary from about 5 to 15 minutes. If the components of the in-mold coating composition are prepared as a two component system where one component comprises the polyurethane prepolymer contaiing excess diisocyanate and the peroxide initiator(s) and the other component contains the unsaturated polyester, unsaturated monomer, polyol(s), any filler, inhibitor, accelerator, urethane catalyst and other additives, the two components separately will exhibit good shelf life if suitably protected from moisture and heat.

The resulting coating exhibits good scratch resistance and has good resistance to gravel impact. Also, the surface smoothness of the coated part approaches in quality that of automotive grade SMC parts.

It is believed that the results obtained are due to the low pressures used resulting in less distortion or stress of the substrate with the low temperatures employed minimizing thermal shrinkage on cooling aided by a rapid curing system. While this invention is especially concerned with FRP made from HMC, it also is applicable to other FRP parts made from SMC, BMC and so forth. Thus, the in-mold coating composition and method disclosed herein can be applied to molded and cured thermoset polyester resin compositions (FRP) containing from about 25 to 75% by weight of glass fibers.

DISCUSSION OF DETAILS AND PREFERRED EMBODIMENTS

In carrying out the method of the present invention the in-mold coating composition may be applied to the thermoset FRP part in the mold which has been cooled below about 150° F. (65.6° C.) to even to room temperature and then coated and cured as described above. Alternatively, the FRP part can be removed from the mold, cooled and placed in another mold having a cavity of a design essentially the same as the FRP part (to take into account the shrinkage etc.) and in-mold coated as described above to get a surface closer to the original design. A further way is to remove the FRP part from the mold, cool, store, clean the surface with a cleaner like methylene chloride to remove any mold lubricant or release agent (to improve reproducibilty of the in-mold coating adhesion), place in the second mold and in-mold coat as described above. One mold can be used to make a plurality of parts which can be cooled, stored or stacked, cleaned and then fed to another mold and in-mold coated as described herein. Moreover, to improve the surface hardness the in-mold coated part may be removed from the mold and baked in an oven for from 5 to 15 minutes at 250° to 350° F. (121° to 177° C.).

While the mold used to make the FRP part per se should be made of steel or other metal and the like, the second mold, if one is used, may be of other material such as an epoxy resin and so forth since the temperatures and pressures for in-mold coating by the present process are substantially less than required for making the original FRP part.

The unsaturated aliphatic polyester is made by copolymerizing maleic anhydride and an alkylene oxide of 3 to 4 carbon atoms such as propylene oxide, butylene oxide, isobutylene oxide and so forth and mixture thereof. Propylene oxide is preferred. The alkylene oxide should be used in a molar ratio greater than the maleic anhydride to provide a polyester which is essentially or all OH terminated, e.g., a polyester diol. The polyester should have an average molecular weight of from about 1500 to 4500 and from about 8 to 30 internal aliphatic carbon-to-carbon double bonds. Up to about 10 mol % of the maleic anhydride may be replaced with a saturated anhydride such as phthalic anhydride or other anhydride and mixture thereof as shown in U.S. Pat. No. 3,538,043. Also, up to 10 mol % of the alkylene oxide moiety may be ethylene oxide; greater amounts are undesirable since it may lead to water sensitivity in the final product. These unsaturated polyesters are made in benzene, styrene or other solvent using a double metal cyanide catalyst as shown in U.S. Pat. No. 3,538,043. As shown in said patent an isomerization catalyst such as piperidine is used to isomerize the maleate double bonds of the polyester to fumarate double bonds. Morpholine, also, may be used as an isomerization catalyst as shown by U.S. Pat. No. 3,576,909.

Polyesters made by reacting maleic anhydride or maleic acid, itaconic acid, citraconic acid, fumaric acid with a glycol like propylene glycol, dipropylene glycol, 1,4-butane diol including phthalic anhydride or acid and so forth may likewise be used, but such esterification processes are time consuming and require high temperatures which may be expensive. Preferred are the polyesters made using the double metal cyanide catalysts as described above.

A saturated aliphatic dihydroxy terminated polyester, also, is employed in the in-mold coating composition to give some degree of flexibility to the coating. It is used in a minor molar amount as compared to the unsaturated polyester diol. The average molecular weight of the saturated polyester is from about 1,500 to 3,000. It can be made by methods well known to the art and should be free of catalyst residues which would adversely affect the urethane forming reaction. Examples of such polyesters are polyethylene butylene adipate (preferred), polyethylene butylene sebacate, polypropylene adipate, polybutylene suberate, polypropylene sebacate and the like and mixture thereof.

The aliphatic polyol crosslinker used in the urethane reaction can be glycerol, trimethylol propane, 1,2,6-hexane triol, pentaerythritol, pentols, sorbitol and other aliphatic polyols having from 3 to 6 hydroxyl groups and their propylene oxide, butylene oxide and/or isobutylene oxide adducts (which may contain up to 10 mol % ethylene oxide or be endcapped with ethylene oxide) having an average molecular weight of from about 92 to 1,000. Methods of making the alkylene oxide adducts of the polyols (except glycerine) using a double metal cyanide catalyst are shown by U.S. Pat. No. 3,829,505. Grafted polyols may, also, be used such as those shown by U.S. Pat. Nos. 3,304,273; 3,383,351 and 3,294,711. If the adducts or telomers are made using KOH or NaOH, the resulting polyetherpolyol should be washed and/or neutralized to reduce or remove the alkaline material which may adversely catalyze the urethane reaction. The aliphatic polyol crosslinker is used in an amount sufficient with the unsaturated polyester diol and any other OH compound to provide adequate crosslinking with the diisocyanate to provide a urethane network of sufficient crosslink density to provide the desired hardness and toughness. The propylene oxide adducts of pentaerythritol having an average molecular weight of from about 400 to 600 are preferred.

The diisocyanate employed may be used as such or reacted with part of the polyol to form a prepolymer, especially when hexamethylene diisocyanate is employed since this isocyanate is believed to be carcinogenic. The diisocyanate should be used in an amount by weight sufficient to provide from about 50 to 120%, preferably from about 80 to 103%, of the stoichiometric amount of —NCO groups required to react with all of the active hydrogen atoms (as determined by the Zerewitinoff method, J.A.C.S., Vol. 49, p. 3181 (1927)), e.g., $H_2O$, hydroxyl groups, of the polyester(s) and polyol(s) and any other OH containing organic compound in the in-mold coating compound taking into consideration the possibility of forming also some biuret or allophanate linkages. Examples of useful diisocyanates or mixtures thereof to employ are 2,4-tolylene diisocyanate (TDI), 2,6-tolylene diisocyanate (TDI), 4,4'-diphenyl methane diisocyanate (MDI), hydrogenated 4,4'-diphenyl methane diisocyanate (or 4,4'-dicyclohexyl methane diisocyanate), polymeric forms of TDI, MDI and hydrogenated MDI, xylene diisocyanate, isophorone diisocyanate and hexamethylene diisocyanate. Of these diisocyanates it is preferred to use 4,4'-diphenyl methane diisocyanate.

The ethylenically unsaturated monomer used to crosslink the unsaturated polyester diol and provide, together with the urethane linkages, a thermoset coating is selected from the group consisting of styrene, alphamethyl styrene, vinyl toluene, methyl methacrylate, acrylamide, acrylonitrile, methyl acrylate and mixtures of these. Of these monomers styrene is preferred. The ethylenically unsaturated monomer is used in an amount sufficient to copolymerize with and/or crosslink the unsaturated polyester diol on being catalyzed by means of a free-radical initiator (peroxide) to form a crosslinked thermoset polyester resin coating.

An organic free-radical or free-radical generating initiator (catalyst) such as a peroxide is used to catalyze the copolymerization or crosslinking between the ethylenically unsaturated low molecular weight monomer and the unsaturated polyester. Examples of free-radical initiators include tertiary butyl perbenzoate, tertiary butyl peroctoate in diallyl phthalate, diacetyl peroxide in dimethyl phthalate, dibenzoyl peroxide, di(p-chlorobenzoyl)peroxide in dibutyl phthalate, di(2,4-dichlorobenzoyl)peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy)hexane, 1-hydroxy cyclohexyl hydroperoxide-1, t-butyl peroxy(2-ethyl butyrate),2,5-dimethyl-2,5-bis(t-butyl peroxy)hexane, cumyl hydroperoxide, diacetyl peroxide, t-butyl hydroperoxide, ditertiary butyl peroxide, 3,5-dihydroxy-3,5-dimethyl-1,2-oxacyclopentane, and 1,1-bis(t-butyl peroxy)-3,3,5-trimethyl cyclohexane and the like and mixtures thereof. It is desirable sometimes to use mixtures of initiators to take advantage of their different decomposition rates and times at different temperatures and so forth. Preferred initiators are benzoyl peroxide in styrene, tertiary butyl perbenzoate and tertiary butyl peroctoate in diallyl phthalate and mixtures thereof. The peroxide initiator is used in an amount of from about 2.5 to 5% by weight based on the weight of the unsaturated polyester and unsaturated monomer(s) employed in the in-mold coating composition.

The accelerator (promoter) for use with the peroxide initiator (catalyst) for unsaturated polyester-unsaturated monomer copolymerization can be a tertiary aromatic amine or a cobalt slat like dimethyl aniline, diethyl aniline, N,N-dimethyl-p-toluidine, cobalt naphthenate, cobalt octoate, or other cobalt salt of a carboxylic acid and so forth. The tertiary aromatic amines are preferred. Some accelerators are effective, or more effective than others, with certain peroxides, and some may cause yellowing. The accelerator should not be mixed alone with the initiator since a violent reaction may occur. Rather the accelerator should be mixed first with one component followed by mixing in the initiator. Preferably, the initiator is mixed with the polyurethane prepolymer composition, and the accelerator is mixed with the unsaturated polyester resin composition prior to use. The accelerator is used in a maximum amount of about 1.5% by weight based on the weight of the unsaturated polyester and unsaturated monomer used in the in-mold coating composition.

For more information on peroxide initiators and accelerators for the same please see "Encyclopedia of Polymer Science and Technology," Interscience Publishers a division of John Wiley & Sons, Inc., New York, Vol. 9, 1968, pages 814 to 841 and Vol. 11, 1969, pages 132 and 133; "Glass Reinforced Plastics," Morgan, Intersciene Publishers a Division of John Wiley & Sons, Inc., New York, 3rd Edition, 1961; "Glass Reinforced Plastics," Parkyn, The Chemical Rubber Company, Cleveland, 1970 and "Glass Fibre Reinforced Plastics," de Dani, Intersciene Publishers, a division of John Wiley & Sons, Inc. New York, 1960.

The polyurethane catalyst should be one which does not accelerate the decomposition of the peroxide initiator. The urethane catalyst when used should facilitate readily the curing of the coating composition; that is, the formation of the urethane network between the isocyanate and active hydrogen containing compounds should proceed simultaneously and smoothly along with the crosslinking operation caused by the free-radical peroxide initiator between the unsaturated monomer and the unsaturated polyester. The polyurethane catalyst is a tin compound such as an organotin compound or a tin salt of a carboxylic acid. Examples of such catalysts are tetravalent tin organic compounds like dibutyl tin dilaurate (preferred), dibutyl tin diacetate, tributyl tin acetate, dilauryl tin diacetate, dibutyl tin di-2-ethyl hexoate, di-2-ethyl hexyl tin bis(2-ethyl hexoate), dibutyl tin distearate, tetramethyl tin and tetra-n-butyl tin and the like and mixtures thereof. If the components of the coating composition are freshly made and promptly used, divalent tin compounds like stannous octoate and stannous oleate and the like and mixtures thereof may be used. However, since these divalent tin compounds may deteriorate on aging or storage, they are less desirable. The polyurethane catalyst is used in an amount of from about 0.05 to 0.9 part by weight per 100 parts by weight total polyol (from polyester, crosslinker, flexibilizer etc.), e.g., active hydrogen containing compound.

The composition additionally can be filled or compounded to give the desired viscosity and flow to the composition for molding and to afford the desired physical properties to the resulting thermoset coating. Examples of such fillers or compounding ingredients are fillers like clay, talc, MgO, $Mg(OH)_2$, $CaCO_3$ and silica, mold release agents, red iron oxide, $TiO_2$, carbon black, organic color pigments like phthalocyanine blue or green, antidegradants, U-V absorbers, calcium silicate, paraffin wax, hollow glass or resin micro-spheres, thickening agents, inhibitors (hydroquinone, benzoquinone, t-butyl catechol etc.) and the like. Preferred fillers are clay, talc, MgO, $Mg(OH)_2$, $CaCO_3$ and silica and mixtures thereof. These fillers and compounding ingredients should be used in amounts sufficient to provide satisfactory results. However, care should be exercised in the use of high filler contents as this may give high viscosities and result in flow and handling difficulties.

All of the ingredients of the in-mold coating composition should be kept dry or have a minimal amount of moisture or the water content should be controlled to obtain reproducible results, to avoid using unnecessary amounts of isocyanates and to prevent foaming or pore formation.

All of the ingredients of the in-mold coating composition can be mixed together and then poured or injected onto the substrate and molded and cured. Several streams or lines can be used to deliver the components of the in-mold coating composition to a mixing head or machine. However, since the mixed in-mold coating composition has a limited shelf life or storageability due to the reactivity of the diisocyanate with the polyols, it is preferred to react the diisocyanate with a portion of the polyol(s) as discussed above to form an isocyanate terminated prepolymer having excess free isocyanate. To the isocyanate prepolymer is added the peroxide initiators for the polyester. Moreover, since the diisocyanate may be rather fluid, it is preferred for handling purposes to increase its viscosity by forming the isocyanate prepolymer. To the unsaturated polyester resin composition containing the other or more polyol(s) is added the accelerator (promoter) and polyurethane catalyst. A stream of the prepolymer and a stream containing the unsaturated polyester composition of the desired viscosity are then fed to the mixing head of a mixing machine which then delivers the reactable in-mold coating to the surface of the substrate where it is molded and cured to the substrate. Mixing of the ingredients should be thorough. Injection or compression, transfer molding, or other molding apparatus or machines can be used for the in-mold coating. Molding apparatus and methods, also, may be found in U.S. Pat. Nos. 4,076,780; 4,076,788 and 4,082,486. Please see, also, "Proceedings of the Thirty-Second Annual Conference Reinforced Plastics/Composites Institute," SPI, Washington, February, 1977, Griffith et al, Section 2-C, pages 1–3 and "33rd Annual Technical Conference, 1978 Reinforced Plastics/Composites Institute The Society of the Plastics Industry, Inc.", SPI, Ongena, Section 14-B, pages 1–7.

The processes and products of the present invention can be used in the manufacture of automobile parts such as grille and headlamp assemblies, deck hoods, fenders, door panels and roofs as well as in the manufacture of food trays, appliance and electrical components, furniture, machine covers and guards, bathroom components, structural panels and so forth. The fiberglass reinforced polyester (FRP) substrate can be a sheet molding compound (SMC) or a bulk molding compound (BMC), or other thermosetting FRP material as shown by "Modern Plastics Encyclopedia," October, 1975, Vol. 52, No. 10A, McGraw-Hill, Inc., New York, pages 105 to 107 as well as a HMC compound to which the present invention is particularly directed.

The following example will serve to illustrate the present invention with more particularity to those skilled in the art.

EXAMPLE

A SMC composition was compression molded and cured at 300° F. (149° C.) and 600 p.s.i. to make a molded (flat plate mold) and cured FRP part. The SMC composition was as follows:

| SMC Composition | |
|---|---|
| Ingredient | Parts by Weight |
| "Paraplex" P340 | 4,000 |
| "Paraplex" P681 | 2,240 |
| "Paraplex" P543 | 772 |
| "Camel-Wite" | 10,520 |
| TBP | 70 |
| Zinc stearate | 350 |
| Mg(OH)$_2$ | 316 |
| Glass fibers | 7,830 |

A HMC composition was compression molded and cured at 300° F. (149° C.) and 600 p.s.i. to make a molded (complicated mold containing ribs and bosses) and cured FRP part. The HMC composition was as follows:

| HMC Composition | |
|---|---|
| Ingredient | Parts by Weight |
| "Selectron" 50322 | 7500 |
| "Selectron" 5988 | 262 |
| Zinc stearate | 150 |
| Tertiary butyl perbenzoate | 60 |
| Glass fibers | 10785 |

Without opening the mold, the temperature of the assembly (part plus mold) was dropped to 140° F. (60° C.). Then the mold was opened and the portion of the mold cavity free of the part was sprayed with a release agent (lecithin). The in-mold coating (a mixture of 11.58 parts by weight of the isocyanate (hardener) composition and 35.705 parts by weight of the resin composition) was hand poured on the part and the mold was reclosed for ten minutes at about 150° F. (65.6° C.) and at a pressure of from about 25 to 50 p.s.i. The mold was then opened and the part was removed and post-baked for ten minutes at 300° F. (148.9° C.).

The two component in-mold coating comprised the following compositions:

| Isocyanate (hardener) Composition | |
|---|---|
| Ingredient | Parts by Weight |
| "Isonate" 143L | 7.25 |
| "Pluracol" PeP450 | 1.03 |
| TBP | .25 |
| PDO Solution | .05 |
| Benzoyl Peroxide Solution | 3.0 |

| Resin Composition | |
|---|---|
| Ingredient | Parts by Weight |
| Polyester | 15.0 |
| Georgia Talc 650 | 10.93 |
| "Formrez" L4-71 | 4.35 |
| "Pluracol" PeP450 | 2.38 |
| "Zelec" UN | .025 |
| Benzoquinone solution | .2 |
| "Stan-Tone" | 2.09 |
| T-12 Solution | .65 |
| N,N-dimethyl p-toluidine | .08 |

The thermoset molded SMC and HMC parts in-mold coated by the method of this example were tested, and the results obtained are shown below:

Table

| Molded and Cured FRP Base | Cured In-Mold Coating | |
|---|---|---|
| | Adhesion By Scratch Pry Testing | Gravelometer Rating* |
| SMC | Good | Not tested |
| SMC | Good | 8 |
| HMC | Good | Not tested |
| HMC | Good | 9 |

*Test for chip resistance of surface coatings - SAE J400; ten is the highest.

Also, the quality of the surface of these in-mold coated SMC and HMC parts approached that the automotive grade SMC parts.

On the other hand the use in the process of this example of a composition as an in-mold coating consisting of "Niax" Polyol D510, "Isonate" 143L, Georgia Talc 650, lecithin, "Pluracol" PeP 450 and T-12 solution gave unsatisfactory results. In other words, this composition did not contain an unsaturated polyester, polymerizable unsaturated monomer nor a peroxide initiator.

Notes for Example:

Polyester—Polypropylene fumarate polyester, OH terminated, acid No. of less than 1, average molecular weight of about 2,400, about 15 double bonds, in styrene monomer (70% by weight PE, 30% STY). Prepared according to the teachings of U.S. Pat. No. 3,538,043 by reacting propylene oxide and maleic anhydride initiated by fumaric acid usign a double metal cyanide catalyst and isomerized with piperidine.

Georgia Talc 650, magnesium silicate (Soapstone).

"Formrez" L4-71—Ethylene butylene adipate polyester, about 2,000 m.w., saturated, OH terminated. Witco Chemical Company.

"Pluracol" PeP 450—Propylene oxide adduct of pentaerythritol, average molecular weight about 450, equivalent hydroxyl weight of 101. BASF Wyandotte.

"Zelec" UN—Fatty alcohol phosphate, unneutralized. du Pont.

Benzoquinone solution—2% by weight benzoquinone in styrene.

T-12 solution—10% by weight dibutyl tin dilaurate in styrene.

"Stan-Tone"—HCC No. 6543 pigment. Mixture of TiO$_2$ and carbon black in "Pluracol" PeP 450, 60% solids. Harwick Chemical Corp.

"Isonate" 143 L—Essentially diphenylmethane-4,4'-diisocyanate, a liquid. The Upjohn Company.

TBP—Tertiary butyl perbenzoate.

PDO solution—Tertiary butyl peroctoate, 50% by weight in diallyl phthalate.

Benzoyl peroxide solution, 10% by weight benzoyl peroxide in styrene.

"Paraplex" P 340—A 65% by weight solution of polyester in styrene, the polyester being essentially a polypropylene fumarate, OH No. of 35, COOH No. of 35, average molecular weight of about 1,600. Rohm & Haas Company.

"Paraplex" P 681—35% by weight solution of polymethylmethacrylate containing some carboxyl groups in styrene. Rohm & Haas Company.

"Paraplex" P 543—35% by weight solution of polymethyl methacrylate in styrene. Rohm & Haas Company.

"Camel-Wite"—Calcium carbonate (limestone), average particle size of 3.3 microns. Campbell Grove Division of H. M. Royal.

"Selectron"—Polymerizable synthetic polyester resins. PPG Industries, Inc.

"Niax" D 510—Polylactone polyol, average formula molecular weight of 530; average hydroxyl number of 212 (mg KOH/g); and acid number, mg KOH/g sample, max. of 0.25. Union Carbide Corporation. Also known as PCP-0200.

I claim:

1. The method which comprises in-mold coating a molded thermoset polyester resin glass fiber composition containing from about 25 to 75% by weight of glass fibers with an in-mold coating composition and curing said in-mold coating composition at a pressure of from about 25 to 50 p.s.i. and at a temperature of not above about 150° F. for from about 2 to 12 minutes, said in-mold coating composition comprising (a) an unsaturated aliphatic polyester diol having an average molecular weight of from about 1,500 to 4,500 and from about 8 to 30 internal aliphatic carbon-to-carbon double bonds, (b) a saturated aliphatic polyester diol flexibilizer having an average molecular weight of from about 1,500 to 3,000 (b) being present in a minor molar amount as compared to (a), (c) an aliphatic crosslinking polyol having from 3 to 6 hydroxyl groups and an average molecular weight of from about 92 to 1,000, (d) a diisocyanate selected from the group consisting of 2,4-tolylene diisocyanate, 2,6-tolylene diisocyanate, 4,4'-diphenyl methane diisocyanate, 4,4'-dicyclohexyl methane diisocyanate, polymeric forms of TDI, MDI and hydrogenated MDI, xylene diisocyanate, isophorone diisocyanate and hexamethylene diisocyanate and mixtures thereof, said diisocyanate being present in an amount by weight sufficient to provide from about 50 to 120% of the stoichiometric amount of —NCO groups required to react with all of the active hydrogen atoms in said coating composition, and (e) an ethylenically unsaturated monomer selected from the group consisting of styrene, alpha methyl styrene, vinyl toluene, methyl methacrylate, acrylamide, acrylonitrile, methyl acrylate and mixtures thereof, said monomer being present in an amount sufficient to copolymerize with and crosslink said unsaturated polyester, in admixture with (f) an organic free radical peroxide initiator in an amount of from about 2.5 to 5% by weight based on the weight of the unsaturated polyester and the unsaturated monomer, (g) an accelerator for said peroxide initiator selected from the group consisting of tertiary aromatic amines and cobalt salts of carboxylic acids in an amount not in excess of about 1.5% by weight based on the weight of the unsaturated polyester and the unsaturated monomer and (h) a polyurethane tin catalyst selected from the group consisting of organotin compounds and tin salts of carboxylic acids in an amount of from about 0.05 to 0.9 part by weight per 100 parts by weight total of the polyols.

2. The method according to claim 1 in which said in-mold coating composition comprises two components which are mixed together and coated on said molded thermoset glass fiber composition wherein I. one component comprises a diisocyanate terminated polyurethane prepolymer containing excess diisocyanate made by reacting (d) with a portion of (c) and containing (f) and II. another component comprises (a), (b), the balance of (c), (e), (g) and (h).

3. The method according to claim 2 in which in said in-mold coating composition said diisocyanate is present in an amount by weight sufficient to provide from about 80 to 103% of the stoichiometric amount of —NCO groups required to react with all of the active hydrogen atoms in said coating composition.

4. The method according to claim 1 in which said in-mold coating composition contains additionally a filler selected from the group consisting of clay, talc, MgO, Mg(OH)$_2$, CaCO$_3$ and silica and mixtures thereof.

5. The method according to claim 1 in which in said in-mold coating composition (a) is a propylene fumarate polyester, (b) is polyethylene butylene adipate, (c) is the adduct of propylene oxide and pentaerythritol having an average molecular weight of from about 400 to 600, (d) is 4,4'-diphenylmethane diisocyanate, (e) is styrene, (f) is a mixture of tertiary butyl perbenzoate, tertiary butyl peroctoate and benzoyl peroxide, (g) is N,N-dimethyl p-toluidine and (h) is dibutyl tin dilaurate.

6. The product produced by the method of claim 1.

7. The product produced by the method of claim 2.

8. The product produced by the method of claim 3.

9. The product produced by the method of claim 4.

10. The product produced by the method of claim 5.

11. The method according to claim 1 where (g) is dimethyl aniline.

12. The method according to claim 1 containing the additional step of baking said in-mold coated molded thermoset polyester resin glass fiber composition at a temperature of from 250° to 350° F. for from 5 to 15 minutes.

13. The product produced by the method of claim 11.

14. The product produced by the method of claim 12.

* * * * *